M. & J. H. WHITE.
GAS GENERATING APPARATUS.
APPLICATION FILED JAN. 17, 1911.
1,023,978.
Patented Apr. 23, 1912.
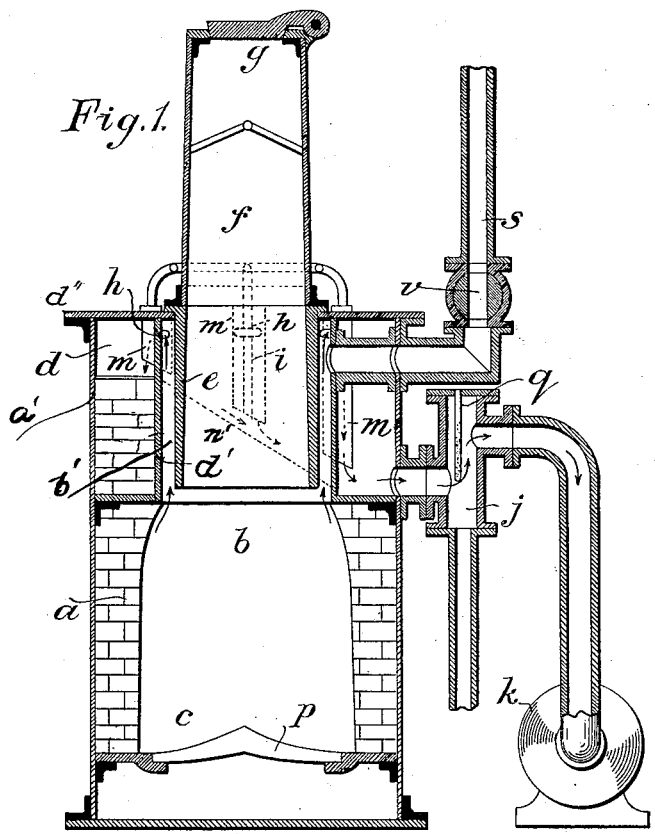
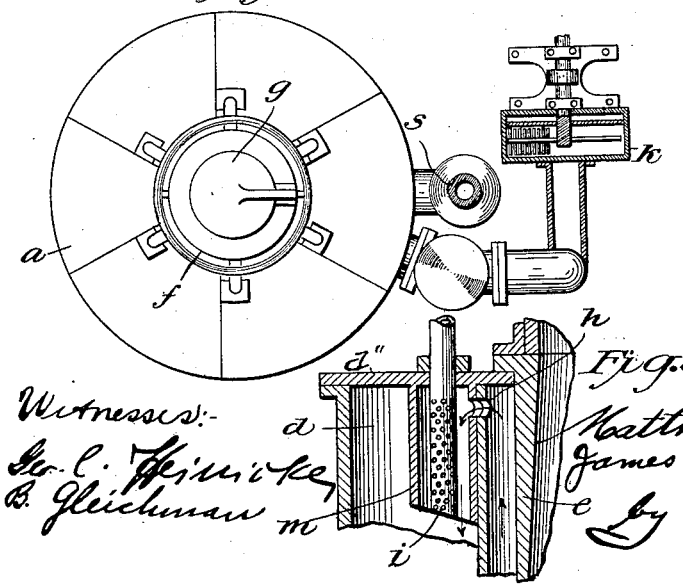

UNITED STATES PATENT OFFICE.

MATTHEW WHITE AND JAMES HENRY WHITE, OF LUTON, ENGLAND.

GAS-GENERATING APPARATUS.

1,023,978.  Specification of Letters Patent.  Patented Apr. 23, 1912.

Application filed January 17, 1911. Serial No. 603,072.

*To all whom it may concern:*

Be it known that we, MATTHEW WHITE and JAMES HENRY WHITE, both of 74 Inkerman street, Luton, Bedfordshire, England, have invented new and useful Improvements in Gas-Generating Apparatus; and we do hereby declare that the following is a full, clear, and exact description of the same, reference being had to the accompanying drawings, forming a part hereof.

This invention relates to certain improvements in apparatus for the manufacture of suction gas from wood refuse for power or heating purposes and has for its object to provide improvements in apparatus for this purpose of the kind in which gas is made in a producer and then led to a dust-settling chamber and thence to the scrubber.

The present invention consists in the improved means whereby the gas produced in the generator is passed into the annular chamber surrounding said generator and in the provision of means whereby the gas is submitted to the action of sprays of water in order to separate the dust and other impurities therefrom after which the gas is passed through a rotary scrubber whereby the tar and resinous matters are extracted and the gas finally discharged for use in a highly purified condition.

In the drawings Figure 1 represents a vertical section of an apparatus constructed in accordance with this invention. Fig. 2 is a plan view of the same partly in section. Fig. 3 is a detail view in vertical section through portions of the apparatus adjacent a spray pipe used in connection therewith.

The producer $a$, of any suitable construction, such as for instance comprising a shaft $b$ arranged above the furnace $c$ and furnished with a blower or the like, is surrounded at its upper portion by an annular chamber $d$ the bottom of which is inclined as indicated at $n$ in Fig. 1. This chamber $d$ is formed in any suitable manner, such as by an extension of the outer side plate $a'$ of the producer $a$, inner annular shell $d'$ and a top plate $d''$, as clearly shown in Fig. 1 of the drawings. A stack $s$ is provided in communication with the shaft $b$ and is controlled by a valve $v$ whereby egress for gases may be formed through the stack $s$, or such stack closed requiring the gases to find other means of egress.

The shaft $b$ is provided with a depending annular flange $e$ projecting some distance within the shaft forming an accumulating chamber $b'$ for the gases generated in the producer $a$. To said flange $e$ is secured a hopper $f$ serving for the introduction of the material to be treated, a lid $g$ being provided to close the hopper when the apparatus is not in use. Both the flange $e$ and the hopper $f$ are preferably tapered in order to prevent the fuel from clinging to the sides. The chamber $d$ communicates with the accumulating chamber $b'$ by means of one or more openings $h$, entering a cylindrical shell $m$ and is provided in the interior with a perforated spray pipe or pipes $i$ whereby a spray of water may be admitted into the chamber $d$ to cool and free gas from dust and similar impurities. $j$ indicates an outlet for the dust laden water which is conducted to such outlet by the inclined floor $n$ of the chamber $d$ at the lowermost portion of which the outlet is in communication. In communication with said annular chamber $d$, in such a manner that the gas therefrom may flow through it, is a chamber $k$ containing a scrubbing apparatus of any suitable design. The water spray $q$ (Fig. 1) is provided so that when the plant is standing and no spray from $i$ is running the gas may be taken to the scrubber $k$ without being affected by the spray pipes $i$. The fire-bars $p$ (Fig. 1) are preferably of the shape shown in order to equalize the draft from the center to the outside. The apertures through which the gas passes from the producer, through the accumulating chamber $b'$, to the annular chamber $d$ are distributed equally around the chamber so that the suction may be equal and so prevent the fire from burning on any one side, the path of the gas during operation of the device being shown by arrows.

We claim:—

1. In a gas generator plant, the combination with a producer having an accumulating chamber formed at its upper end, of a second chamber, including an inclined floor, provided with inlet openings adjacent its upper end in communication with the said chamber in said producer, egress means disposed at the lowermost portion of said second mentioned chamber whereby the gas is drawn from the top to the bottom of the latter, elongated spray pipes, disposed within said second mentioned chamber and extending longitudinally in the path of movement of the gas, and means confining the currents of gas in close proximity to said spray pipes throughout its travel thereby, substantially as and for the purpose set forth.

2. In a gas generator plant, the combination with a producer having an accumulating chamber formed at its upper end, of a second chamber, including an inclined floor, provided with openings in communication with said accumulating chamber in said producer, a plurality of spray pipes contained within said second mentioned chamber one in proximity to each of the said openings thereof to spray the incoming gases with fluid, and an outlet means at the lowermost portion of said second mentioned chamber adapted to separate the dust laden fluid and gases, substantially as described.

3. In a gas generator plant, the combination with a producer having an accumulating chamber formed at its upper end, of a second chamber provided with openings in communication with said accumulating chamber in said producer, spray pipes contained within said second mentioned chamber one in proximity to each of the said openings thereof to spray the incoming gases with fluid, means confining the current of gas in close proximity to said spray pipes throughout its travel thereby, and egress means for said second mentioned chamber separating the dust-laden fluid and gases, substantially as described.

4. In a generator plant, the combination with a producer having an accumulating chamber formed at its upper end, of a second chamber, including an inclined floor, provided with a plurality of openings in communication with the accumulating chamber in said producer, spray pipes contained within the said second mentioned chamber one in proximity to each of the said openings thereof to spray the incoming gases with fluid, and outlet means at the lowermost portion of said second mentioned chamber, including upper and lower branches extending above and below the axis of the opening at the communication with said second mentioned chamber the said upper branch forming egress means for the gases, and the said lower branch forming egress for the dust-laden fluid, and a liquid spray in said upper branch disposed in alinement with said lower branch to permit egress of the liquid emitted from the former to have egress through the said lower branch.

5. In a gas generator plant, in combination with a producer having an accumulating chamber formed at its upper end, of a second chamber, including an inclined floor, provided with inlet openings adjacent its upper end, in communication with the said accumulating chamber in said producer, egress means disposed at the lowermost portion of said second mentioned chamber whereby the gas is drawn from the top to the bottom of the latter, elongated spray pipes disposed within said second mentioned chamber and extending longitudinally in the path of movement of the gas, a dividing chamber including upper and lower branches extending above and below the horizontal, respectively, and in alinement with each other, and a spray in said upper branch, substantially as and for the purpose set forth.

In testimony whereof we affix our signatures in presence of two witnesses.

MATTHEW WHITE.
JAMES HENRY WHITE.

Witnesses:
GEO. PRINGLE,
HARRY ARNOLD.

---

Copies of this patent may be obtained for five cents each, by addressing the "Commissioner of Patents, Washington, D. C."